United States Patent [19]

Barkhurst

[11] 3,990,326
[45] Nov. 9, 1976

[54] UNIVERSAL ATTACHMENT DRIVE
[75] Inventor: Ernest F. Barkhurst, Euclid, Ohio
[73] Assignee: Acme-Cleveland Corporation, Cleveland, Ohio
[22] Filed: June 3, 1974
[21] Appl. No.: 475,456

[52] U.S. Cl. .......................................... 74/665 GA
[51] Int. Cl.² ........................................ F16H 37/06
[58] Field of Search ....... 74/665 F, 665 G, 665 GA; 408/42, 46, 124

[56] References Cited
UNITED STATES PATENTS

| | | | |
|---|---|---|---|
| 733,719 | 7/1903 | Kehl et al. .................... | 74/665 GA X |
| 1,136,650 | 4/1915 | Brown ............................. | 74/665 G |
| 2,549,490 | 4/1951 | Kuhl ............................... | 74/665 GA |
| 2,755,685 | 7/1956 | Emrick .......................... | 74/665 GA |
| 2,879,675 | 3/1959 | Morris ........................... | 74/665 GA |
| 2,885,937 | 5/1959 | Donnay .......................... | 74/665 G |
| 3,173,302 | 3/1965 | Robinson ..................... | 74/665 GA X |
| 3,753,376 | 8/1973 | Ribeiro ........................... | 74/665 GA |
| 3,794,436 | 2/1974 | Rowlett ........................ | 74/665 GA X |

OTHER PUBLICATIONS
"Things That Make a Difference", W. E. Hoffman (editor), Tooling and Production, Nov. 1972.

Primary Examiner—Samuel Scott
Assistant Examiner—Lance W. Chandler
Attorney, Agent, or Firm—Woodling, Krost, Granger & Rust

[57] ABSTRACT

An attachment drive for a multiple spindle machine is disclosed which machine has a front gearbox wall and a rear gearbox wall defining a gearbox therebetween. A spindle drive shaft extends through the walls in a conventional manner. The front gearbox wall has a plurality of front mounting holes whereas the rear gearbox has at least one rear mounting hole which is aligned with one of the front mounting holes. An idler gear is mounted on the spindle drive shaft within the gearbox with a spindle drive means secured to the spindle drive shaft outside of the gearbox. A first front cartridge journals a first front cartridge shaft and a first rear cartridge journals a first rear cartridge shaft in respective front and rear mounting holes having a common axis of symmetry. A coupling interconnects the first front cartridge and the first rear cartridge with the rear cartridge engaging the spindle drive means to rotate the first front cartridge shaft in accordance with the rotation of the spindle drive shaft. A first front cartridge gear drives the idler gear which in turn drives a second front cartridge comprising a second front cartridge shaft with a second front cartridge gear thereon. Consequently, the power is transferred from the spindle drive shaft through the first front and rear cartridges to the second front cartridge and allows power to be applied at any of the positions of a multiple spindle machine. Also, by a spacer in the front cartridge, instead of a gear driven from the idler gear, and utilizing gears or sprockets on the rear cartridge driven from the spindle shaft, any selected speed or direction may be achieved for drives at other spindle positions.

13 Claims, 5 Drawing Figures

UNIVERSAL ATTACHMENT DRIVE

BACKGROUND OF THE INVENTION

1. Field of the Invention

The invention relates to metal working and more particularly to metal working with a multiple spindle machine.

2. Description of the Prior Art

Multiple spindle machines have been known to the prior art for a great number of years. In general, multiple spindle machines comprise a plurality of spindles rotatably mounting a plurality of workpieces surrounding a spindle drive shaft. A tool holder located in a tooling area adjacent the spindles provides a mounting for various tools to simultaneously operate on the workpieces. A front gearbox wall and a rear gearbox wall define a gearbox area therebetween and adjacent the tooling area. The area beyond the rear gearbox wall defines a spindle drive area. When a tool attachment required a drive in the prior art, the spindle drive shaft in the spindle drive area was adapted to receive a drive gear to power a shaft extending from the rear to the front gearbox wall. These shafts were adapted to power a particular type of tool, for example, high-speed drilling, threading, milling or the like. One disadvantage of this prior art drive was that the drive was difficult to achieve in the lower positions of the spindles, i.e., position 1 and position 6 in a six spindle machine, since corresponding mounting holes did not appear in the rear gearbox wall, and a special sleeve with two sets of bearings had to be fitted and assembled part by part in only the front gearbox wall. This was also true for other drives in still other positions, they also required special sleeves. The absence of lower holes in the rear gearbox wall was due to the fact that this space was required for cams to reciprocate the tool holders and tool slides in the tool area. Consequently, external drives such as air motors were often used for the lower positions. A further disadvantage of the prior art was that the assembly of the attachment drive shaft between the front and rear gearbox wall was a significant undertaking. The shaft had to be pushed through the rear gearbox wall into the gearbox area and the particular gears required had to be mounted thereon before the end of the shaft was pushed through the front gearbox wall. Incorporating several bearings within the structure made the typical set-up time for a tool attachment drive shaft a 6 to 8 hour undertaking for a man skilled on such a machine.

Therefore, an object of this invention is to provide an attachment drive for a multiple spindle machine which is universal for all tool drives.

Another object of this invention is to provide an attachment drive for a multiple spindle machine wherein preassembled cartridges, both front and rear, are easily installed or removed in the machine at set-up time, and the cartridges do not need to be disassembled for removal from the machine.

Another object of this invention is to provide an attachment drive for a multiple spindle machine which can transfer power between adjacent or remote tool-drive locations.

Another object of this invention is to provide an attachment drive for a multiple spindle machine wherein the tool drive shaft may be assembled and installed in a rapid time.

SUMMARY OF THE INVENTION

An attachment drive for a multiple spindle machine which has a front gearbox wall and a rear gearbox wall defining a gearbox therebetween with a driven spindle drive shaft extending through the walls, comprising in combination, the front gearbox wall having a plurality of front mounting holes, the rear gearbox wall having a rear mounting hole, one of said front mounting holes being aligned with said rear mounting hole to have a common axis of symmetry, idler means, means mounting said idler means for movement within the gearbox, spindle drive means secured to the spindle drive shaft, a first front cartridge including a journalled first front cartridge shaft, a first rear cartridge including a journalled first rear cartridge shaft, means respectively mounting said first front and rear cartridges in said front and rear wall mounting holes having a common axis of symmetry, means interconnecting said first front cartridge shaft and said first rear cartridge shaft, first rear cartridge drive means, means mounting said first rear cartridge drive means on said first rear cartridge shaft to engage with said spindle drive means for rotating said first front and rear cartridge shafts in accordance with the rotation of the spindle drive shaft, first front cartridge drive means, means mounting said first front cartridge drive means on said first cartridge shaft for driving said idler means in accordance with the rotation of said first front cartridge shaft, a second front cartridge comprising a second front cartridge mount and a second front cartridge shaft, said second front cartridge mount adapted to receive an attachment to be driven by said second front cartridge shaft, means for mounting said second front cartridge in one of said front mounting holes, second front cartridge drive means, and means mounting said second front cartridge drive means on said second front cartridge shaft to engage with said idler means for driving the attachment on said second cartridge from the rotation of said first cartridge shafts.

Other objects and a fuller understanding of the invention may be had by referring to the following description and claims, taken in conjunction with the accompanying drawings.

DESCRIPTION OF THE PREFERRED EMBODIMENT

Figure 1:
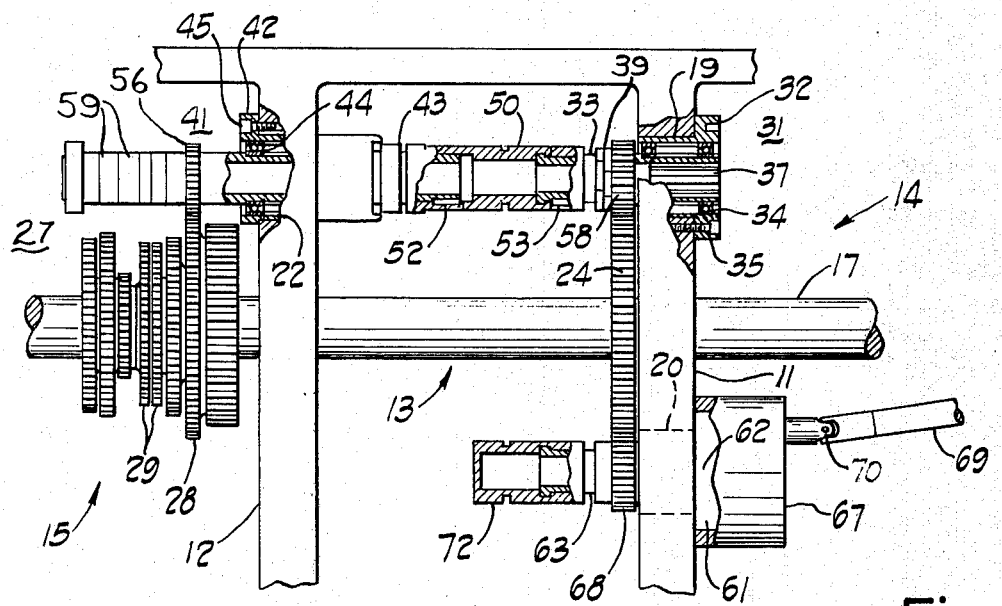
FIG. 1 is a side elevational view, partly in section, of a portion of a multiple spindle machine showing the tooling area, the gearbox area and the spindle drive area.

FIG. 1 is the preferred embodiment of the invention showing an attachment drive for a multiple spindle machine which has a front gearbox wall 11 and a rear gearbox wall 12 defining a gearbox 13 therebetween. A tooling area 14 is on one side of the front gearbox wall whereat tooling may cooperate with the usual workpiece-carrying spindles whereas a spindle drive area 15 is on the other side of the rear gearbox wall 12. A spindle drive shaft 17 is driven by means not shown, and extends through the tooling area 14, the first and second gearbox walls 11 and 12 into the spindle drive area 15. The front gearbox wall 11 includes a plurality of front mounting holes 19 and 20, whereas the rear gearbox wall 12 includes at least one rear mounting hole 22 which is aligned with the front mounting hole 19 to have a common axis of symmetry. Typically, a six spindle machine will have six front mounting holes and four rear mounting holes with two front mounting holes on the bottom, one represented as mounting hole 20, not having corresponding rear mounting holes. An idler gear 24 is rotatably mounted on the spindle drive shaft 17 to provide power transfer between drive attachments as hereinafter described. Spindle drive means shown generally as 27 and including a spindle drive gear 28 and spindle drive sprockets 29 is secured to the spindle drive shaft 17 for rotation therewith.

A first front cartridge shown generally as 31 includes a stationary mounting 32 for journalling a front cartridge shaft 33 on bearings 34. The stationary mounting 32 is in the form of a flanged bushing secured to the front gearbox wall 11 by a plurality of threaded fasteners including fastener 35 in a manner that the stationary mounting 32 extends into the tooling area 14 whereas the front cartridge shaft 33 extends into the gearbox 13. The first front cartridge shaft 33 is hollow and keyed shown as splines 37 in the front portion of the shaft 33 to receive an attachment shaft therein.

Figure 2:
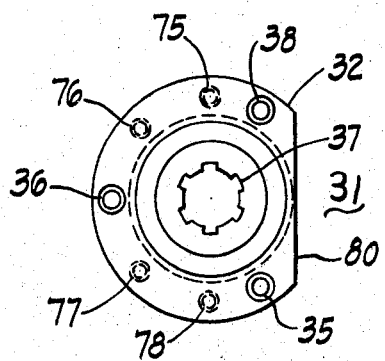
FIG. 2 is a front view of a front cartridge mounting.

FIG. 2 is a front view of the first front cartridge 31 showing threaded fasteners 35, 35 and 38 for securing the front cartridge stationary mounting 32 to the front gearbox wall 11. The front cartridge 31 also includes tapped holes 75, 76, 77 and 78 for securing an attachment to the stationary mounting 32. The splines 37 are more clearly shown in this front view. The stationary mounting 32 acts as a pilot surface being partially cylindrical to coaxially locate an attachment, and having a flat side 80 for added clearance for a central tool slide, now shown, surrounding the spindle drive shaft 17 in the tooling area 14.

A first rear cartridge shown generally as 41 includes a stationary mounting 42 for journalling a rear cartridge shaft 43 on bearings 44. The stationary mounting 42 is secured to the rear gearbox wall 12 by threaded fasteners 45 such that the rear cartridge shaft 43 extends into the gearbox 13. A coupling sleeve 50 interconnects the front and rear cartridge shafts 33 and 43. Keys 52 and 53 cooperate with the keyways in the front and rear cartridge shafts 33 and 43 and keyways in the coupling sleeve 50 to prevent relative rotation between the front and rear cartridge shafts and to transmit rotation therebetween. The rear cartridge shaft 43 and the coupling sleeve 50 are both shown as being hollow to receive an attachment shaft therein.

A first rear cartridge drive gear 56 is secured to the first rear cartridge shaft 43 and engaged with the spindle drive gear 28 to rotate the first front cartridge shaft 33 in accordance with the rotation of the spindle drive shaft 17. A first front cartridge drive gear 58 is secured to the first front cartridge shaft 33 to engage with the idler gear 24 for driving the idler gear in accordance with the rotation of the spindle drive shaft 17.

A second front cartridge shown generally as 61 is substantially identical to the first front cartridge 31 including a stationary mounting 62 journalling a second front cartridge shaft 63 on bearings, not shown. The second front cartridge is mounted in mounting hole 20 by threaded fasteners, not shown, in a manner similar to the first front cartridge 31 so that the stationary mounting 62 extends into the tooling area 14 whereas the second front cartridge shaft 63 extends into the gearbox. The second front cartridge 61 is adapted to receive an attachment 67 shown as a speed change gearbox which is driven by the second front cartridge shaft 63. A second front cartridge drive gear 68 is secured to the second front cartridge shaft 63 to engage with the idler gear 24. Consequently, power from the spindle drive shaft 17 is transferred through gears 28 and 56 to the first front and rear cartridge shafts 33 and 43 and through gears 58, 24 and 68 to rotate the second front cartridge shaft 63 in accordance with the rotation of the spindle drive shaft 17. It is understood that the rotation of the second front cartridge shaft 63 may not necessarily be at the same rotational speed as the spindle drive shaft 17. The second cartridge shaft 63 drives the attachment 67 to power a shaft 69 through a universal joint 70 to power a tool in the tooling area 14. In FIG. 1, the power of the spindle drive shaft 17 is transferred through the first rear and front shafts 43, 33 and idler gear 24 to the lower position of the second front cartridge 61. This eliminates the necessity of special sleeve unit in the front wall since the position of the second front cartridge 61 lacks a corresponding rear mounting hole in the rear gearbox wall 12. The second front cartridge shaft 63 is shown as including a protective cap 72 for preventing cooling fluid from the tooling area 14 from entering the gearbox area 13 through the hollow front cartridge shaft 63 when the attachment 67 is removed.

It can also be appreciated from FIG. 1 that the assembly of the first front and rear cartridges 31 and 41 is a relatively simple task. Both the front and rear cartridges may be preassembled with the front cartridge 31 including the first front cartridge drive gear 58 secured by nut 39 and with the first rear cartridge 41 including the first rear cartridge drive gear 56, longitudinally positioned by spacer bushings 59. The spacer bushings 59 are provided so that a gear 56 or a sprocket may be positioned at any desired longitudinal position along the rear cartridge 41 for drive from a corresponding gear or sprocket on the spindle drive shaft 17. In addition, the coupling sleeve 50 can be initially secured to either the front or the rear cartridge shaft 43 and 33. For example, assume that the front cartridge was assembled including the first front cartridge drive gear 58 and the coupling sleeve 50 with the key 53 preventing rotation between the coupling sleeve 50 and the first front cartridge shaft 33. The first front cartridge and coupling sleeve 50 is inserted through mounting hole 19 from the tooling area 14 and is secured to the front gearbox wall 11 by the threaded fasteners 35, 36, and 38. Then the first rear cartridge 41 including drive gear 56 is inserted through the rear mounting hole 22 from the spindle drive area 15 with the key 52 being inserted between the rear cartridge shaft 43 and the coupling sleeve 50. The first rear cartridge 41 is secured to the rear gearbox wall 12 by the threaded fasteners 45. Consequently, the time of installing a front and rear cartridge is significantly less than the prior art drives being only about 20 minutes.

Figure 3:
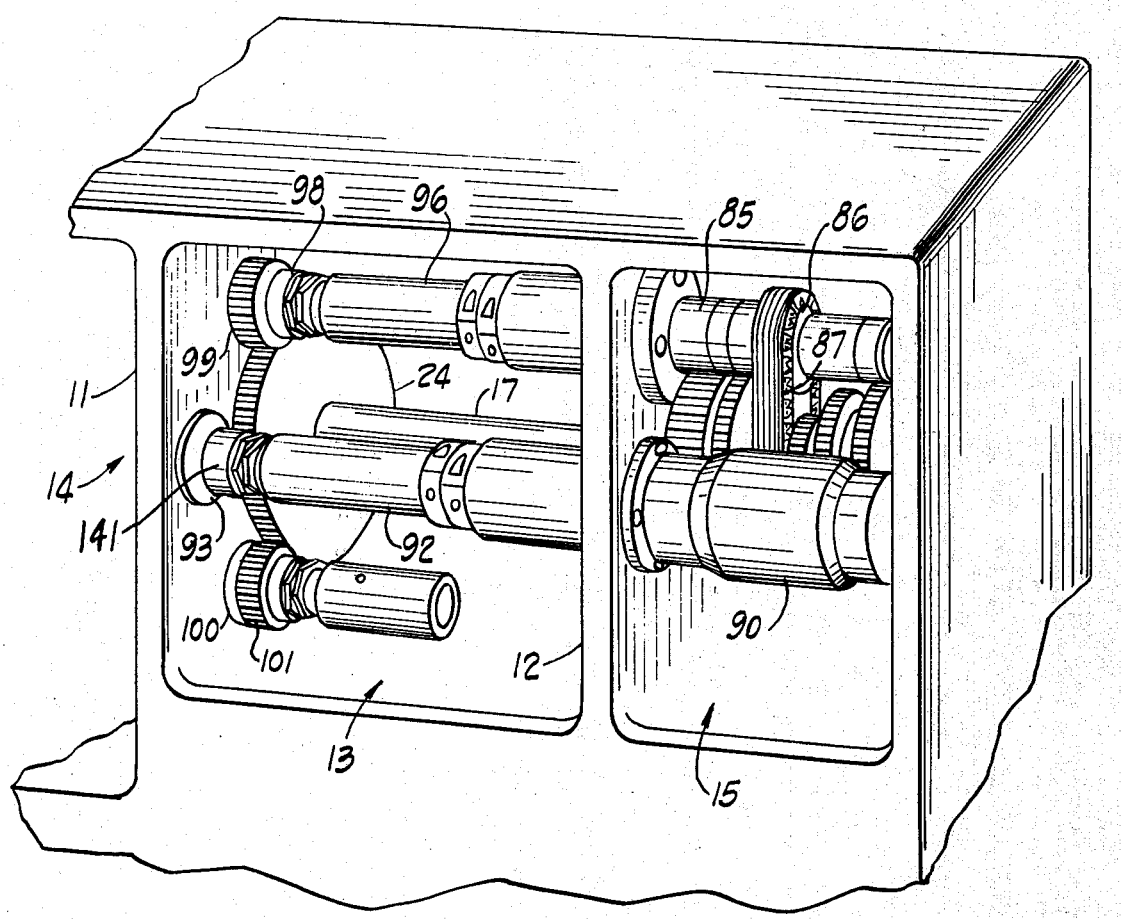
FIG. 3 is an isometric view of a portion of multiple spindle machine in a second embodiment showing the gearbox and spindle drive area.

FIG. 3 is an isometric view of a portion of a second embodiment of a multiple spindle machine showing the front and rear gearbox walls 11 and 12 defining the tooling area 14, the gearbox 13 and the spindle drive area 15. The spindle drive shaft 17 drives a plurality of drive gears and sprockets in the spindle drive area 15 to power a rear cartridge 85 by a sprocket 86 and chain 87 and to simultaneously power a universal threading attachment 90. The universal threading attachment 90 is secured to the rear gearbox wall 12 in a manner similar to the rear cartridge 85. The front section of the universal threading attachment 90 is connected through a coupling sleeve 92 to a front cartridge 93 void of a front cartridge drive gear and instead containing a spacer 141. Front cartridge then powers a universal threading attachment, not shown, in the tooling area 14. In FIG. 3, all three of the front cartridges 98, 93 and 100 are the same, except for gears on cartridges 98 and 100 and the spacer 141 on cartridge 93. The rear cartridge 85 is connected by a coupling sleeve 96 to a front cartridge 98 having a front cartridge drive gear 99 which is engaged with the idler gear 24. A second front cartridge 100 having a front cartridge drive gear 101 engages the idler gear 24 to provide tooling power in the lower position occupied by the cartridge 100. It should be noted that the position in this multiple spindle machine occupied by cartridge 100 does not have a corresponding rear mounting hole in the rear gearbox wall 12. In setting up the tooling in a multiple spindle machine certain positions are extremely difficult to mount a particular type of tool attachment. Consequently, one skilled in the art can realize the benefit of the instant invention. The drive from the spindle drive shaft 17 provides independent universal threading through front cartridge 93 with front cartridges 98 and 100 each capable of performing separate operations through the power supplied on chain 87.

Figure 4:
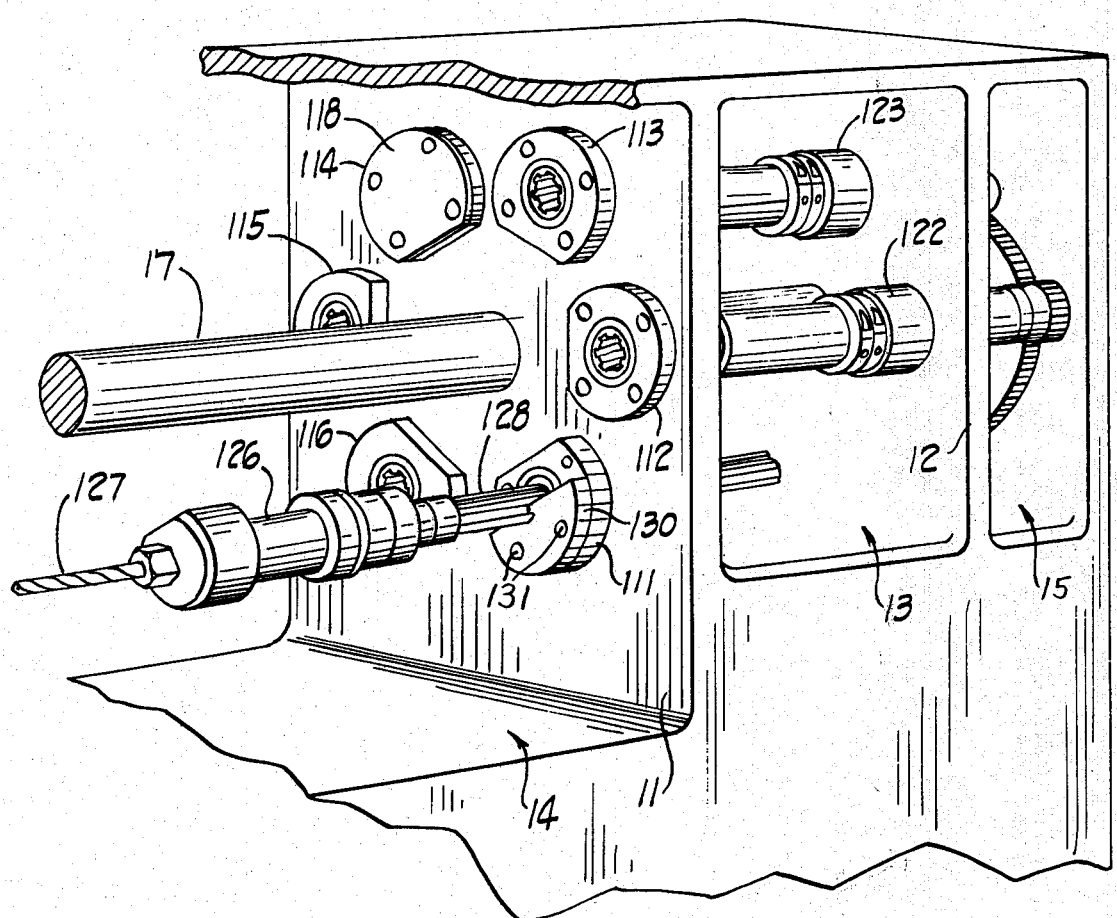
FIG. 4 is an isometric view of a portion of a multiple spindle machine in a third embodiment showing the tooling area and a portion of the gearbox and spindle drive areas.

FIG. 4 is an isometric view of a third embodiment of a multiple spindle machine showing the six front cartridges designated 111, 112, 113, 114, 115 and 116. The first and sixth position 111 and 116 do not have corresponding rear mounting holes in the rear gearbox wall 12. In this embodiment front cartridge 114 is covered by a protective plate 118 since this cartridge is not in use. Front cartridges 112 and 113 are powered respectively by the corresponding rear cartridges 122 and 123 but for simplicity the tool attachments to these front cartridges have not been shown. Front cartridge 111 receives a drilling attachment 126 having a drill bit 127 and a keyed shaft 128. The shaft 128 cooperates with the splines 37 to allow the drilling attachment 126 to longitudinally reciprocate along the shaft 128 through the front cartridge 111. An anti-rotation plate 130 is secured to the front cartridge 111 by screws 131 to prevent rotation of the front cartridge shaft and the drilling attachment 126. The anti-rotation plate 130 locks the front cartridge shaft relative to the front gearbox wall 11.

Figure 5:
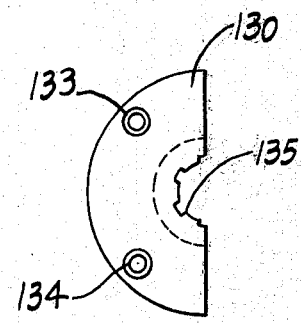
FIG. 5 is a front view of an anti-rotation plate.

FIG. 5 is a front view of the anti-rotation plate 130 including holes 133 and 134 to receive the screws 131 for cooperation with the holes 76 and 77 of the stationary member 32 in FIG. 2. The splines 135 eliminate rotation of the keyed shaft 128 therethrough.

The invention has been described as a tool attachment drive for a multiple spindle machine which has a front gearbox wall 11 and a rear gearbox wall 12 defining a gearbox 13 therebetween with a driven spindle drive shaft 17 extending through the walls. The front gearbox wall has a plurality of front mounting holes shown as holes 19 and 20. The rear gearbox wall 12 has a rear mounting hole 22 with one of the front mounting holes shown as hole 19 being aligned with the rear mounting hole 22 to have a common axis of symmetry. Idler means shown as idler gear 24 is mounted for movement within the gearbox on the shaft 17. Spindle drive means shown as gear 28, for example, is secured to the spindle drive shaft 17. A first front cartridge 31 journalling a first front cartridge shaft 33 and a first rear cartridge 41 journalling a rear cartridge shaft 43 are respectively mounted on the front and rear gearbox walls 11 and 12. Means shown as coupling 50 interconnect the first front cartridge shaft and the first rear cartridge shaft. A first rear cartridge drive means shown as drive gear 56 is mounted on the first rear cartridge shaft to engage with the spindle drive means for rotation of the first front and rear cartridge shafts in accordance with the rotation of the spindle drive shaft. First front cartridge drive means shown as drive gear 58 is mounted on the first front cartridge shaft for driving the idler means 24 in accordance with the rotation of the first front cartridge shaft 33. A second front cartridge 61 including a front cartridge mount 62 and a second front cartridge shaft 63 is adapted to receive an attachment 67 to be driven by the second front cartridge shaft. The second front cartridge is mounted in one of the front mounting holes 20 and has second front cartridge drive means shown as drive gear 68 mounted on the second front cartridge shaft 63 to engage the idler means 24 for driving the attachment 67 on the second cartridge from the rotation of the first cartridge shaft.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An attachment drive for a multiple spindle machine which has a front gearbox wall and a rear gearbox wall defining a gearbox therebetween with a driven spindle drive shaft extending through the walls, comprising in combination:

the front gearbox wall having a plurality of front mounting holes therethrough and uniformly spaced from said spindle drive shaft;

the rear gearbox wall having a plurality of rear mounting holes therethrough with each hole aligned with respective ones of said front mounting holes to have a common axis of symmetry;

idler means rotatably mounted on and relative to said spindle drive shaft for movement within the gearbox;

spindle drive means secured to the spindle drive shaft outside of the gearbox;

a first front cartridge including a first front stationary mounting and a bearing therein journaling first front cartridge shaft;

said first front cartridge being insertable in one of said front mounting holes from an area outside of the gearbox with said first front stationary mounting being securable to the front gearbox wall and with said first front cartridge shaft extending into the gearbox;

a first rear cartridge including a first rear stationary mounting and a bearing therein journaling a first rear cartridge shaft;

said first rear cartridge being insertable in one of said rear mounting holes having a common axis of symmetry with said one of said front mounting holes from an area outside of the gearbox with said first rear stationary mounting being securable to the rear gearbox wall and with said first rear cartridge shaft having a portion thereof extending into the gearbox and having a portion thereof extending outside of the gearbox;

means interconnecting said first front cartridge shaft and said first rear cartridge shaft within the gearbox;

first rear cartridge drive means;

means mounting said first rear cartridge drive means on said portion of said first rear cartridge shaft extending outside of the gearbox to engage with said spindle drive means for rotating said first front and rear cartridge shafts in accordance with the rotation of the spindle drive shaft;

first front cartridge drive means;

means mounting said first front cartridge drive means on said first cartridge shaft within the gearbox for driving said idler means in accordance with the rotation of said first front cartridge shaft;

a second front cartridge including a second front stationary mounting and a bearing therein journaling a second front cartridge shaft;

said second front cartridge stationary mounting having a pilot surface extending into a tooling area outside of the gearbox adapted to receive a first attachment to be driven by said second front cartridge shaft;

said second front cartridge being insertable in one of the remaining front mounting holes from an area outside of the gearbox with said second front stationary mounting being securable to the front gearbox wall and with said second front cartridge shaft extending into the gearbox;

second front cartridge drive means;

and means mounting said second front cartridge drive means on said second front cartridge shaft within the gearbox to engage with and be driven by said idler means on said spindle drive shaft from the rotation of the spindle drive shaft through said first front and rear cartridge shafts and drive means to provide power to the first attachment on said second front cartridge.

2. A drive as set forth in claim 1 wherein said pilot surface is at least partially cylindrical to coaxially locate the first attachment.

3. A drive as set forth in claim 1 wherein said idler means includes an idler gear.

4. A drive as set forth in claim 1 wherein said spindle drive means includes a spindle drive gear.

5. A drive as set forth in claim 1 wherein said first front cartridge mounting is adapted to receive a second attachment to be driven by said first front cartridge shaft.

6. A drive as set forth in claim 1 wherein said means for interconnecting said front cartridge shaft and said rear cartridge shaft includes coupling sleeve means.

7. A drive as set forth in claim 6 wherein said front and rear cartridge shafts are keyed, and said coupling sleeve means is keyed for cooperation with said front and rear cartridge shaft keys to transmit rotation between said front and rear shafts.

8. A drive as set forth in claim 1 wherein said second front cartridge mounting includes tapped holes to receive threaded members for securing the first attachment to said mount.

9. A drive as set forth in claim 1 wherein the first attachment includes means for preventing rotation of said second front cartridge shaft.

10. A drive as set forth in claim 1 wherein each of said front cartridge mountings includes a cylindrical housing for mounting in said front mounting holes.

and an enlarged flange on one end of said housing to abut the front gearbox wall.

11. A drive as set forth in claim 1 wherein said front cartridge shafts are hollow and keyed to receive a keyed first attachment shaft.

12. A drive as set forth in claim 11 wherein the first attachment shaft is keyed for rotation with said second front cartridge shaft and adapted to longitudinally reciprocate along the axis of said second front cartridge shaft.

13. A drive as set forth in claim 11 including a cup for securing to said front cartridge shaft in the gearbox to prevent coolant of the tooling area from entering the gearbox.

* * * * *